US009049530B2

(12) United States Patent
Mishra

(10) Patent No.: US 9,049,530 B2
(45) **Date of Patent: *Jun. 2, 2015**

(54) MULTIPLE CHANNEL AUDIO SYSTEM SUPPORTING DATA CHANNEL REPLACEMENT

(75) Inventor: Brajabandhu Mishra, Orissa (IN)

(73) Assignee: BROADCOM CORPORATION, Irvine, CA (US)

( * ) Notice: Subject to any disclaimer, the term of this patent is extended or adjusted under 35 U.S.C. 154(b) by 405 days.

This patent is subject to a terminal disclaimer.

(21) Appl. No.: 13/246,340

(22) Filed: Sep. 27, 2011

(65) Prior Publication Data

US 2012/0057709 A1 Mar. 8, 2012

Related U.S. Application Data

(63) Continuation of application No. 11/282,596, filed on Nov. 21, 2005, now Pat. No. 8,027,485.

(51) Int. Cl.

| | |
|---|---|
| ***H04B 3/00*** | (2006.01) |
| ***H04S 3/00*** | (2006.01) |
| ***H04H 40/27*** | (2008.01) |
| *H04H 20/33* | (2008.01) |
| *H04H 20/89* | (2008.01) |

(52) U.S. Cl.

CPC .................. *H04S 3/00* (2013.01); *H04H 20/33* (2013.01); *H04H 20/89* (2013.01); *H04H 40/27* (2013.01)

(58) Field of Classification Search

CPC ........... H04S 3/006; H04S 3/008; H04S 3/02; H04S 7/308; H04S 2400/03; H04S 2420/03; H04S 2420/13; G10L 19/008; G10L 25/78; H04R 5/02; H04R 5/04; H04R 2420/07; H04R 20/10; H04R 20/42; H04R 20/65; H04R 20/89; H04R 60/12

USPC ........... 381/77, 80, 81, 306, 307, 22, 23, 1, 2, 381/3, 6; 375/240, E7.026, E7.192, 219; 455/3.01, 3.06, 452.2, 177.1, 200.1, 455/266; 725/133, 141, 153, 95; 348/E7.045, 552; 700/94

See application file for complete search history.

(56) References Cited

U.S. PATENT DOCUMENTS

| | | | | |
|---|---|---|---|---|
| 5,892,794 | A * | 4/1999 | Slegers | 375/219 |
| 6,028,526 | A | 2/2000 | Mercs | |
| 6,088,461 | A | 7/2000 | Lin et al. | |
| 6,915,425 | B2 | 7/2005 | Xu et al. | |
| 8,027,485 | B2 | 9/2011 | Mishra | |
| 2003/0027120 | A1 | 2/2003 | Jean | |
| 2003/0101460 | A1 | 5/2003 | Liu | |
| 2005/0157883 | A1 * | 7/2005 | Herre et al. | 381/17 |
| 2005/0265172 | A1 | 12/2005 | Stankiewicz et al. | |

(Continued)

*Primary Examiner* — Leshui Zhang
(74) *Attorney, Agent, or Firm* — Foley & Lardner LLP

(57) ABSTRACT

An audio processing system is disclosed. The audio processing system may include a processor and a transmitter and may allow a surround sound system to utilize the transmission bandwidth efficiently by adaptively transmitting a supplementary data from a secondary source in addition to the audio signals of a primary source. The processor may determine a first number of channels available for audio in the transmitter and a second number of channels available in a remote receiver that is capable of receiving the audio. The processor may cause a secondary source to adaptively communicate a combination of data from a plurality of supplementary sources in some of a plurality of channels of the audio based upon the first number of channels and the second number of channels.

20 Claims, 5 Drawing Sheets

(56) References Cited

U.S. PATENT DOCUMENTS

2006/0010500 A1 1/2006 Elazar et al.
2006/0228683 A1 10/2006 Jianping
2006/0288843 A1 12/2006 Helton
2007/0044137 A1 2/2007 Bennett
2007/0116297 A1 5/2007 Mishra
2009/0060206 A1* 3/2009 Shiba ................................ 381/2

* cited by examiner

MULTIPLE CHANNEL AUDIO SYSTEM SUPPORTING DATA CHANNEL REPLACEMENT

CROSS-REFERENCE TO RELATED APPLICATION/INCORPORATION BY REFERENCE

The present application is a CONTINUATION of U.S. application Ser. No. 11/282,596, filed Nov. 21, 2005, now issued U.S. Pat. No. 8,027,485. The above-identified application is hereby incorporated herein by reference in its entirety.

BACKGROUND OF THE INVENTION

1. Field of the Invention

The present invention relates generally to an audio system, such as efficient use of communication bandwidth reserved for a surround sound audio system. The surround sound audio systems typically include a surround sound audio transmitter as well as a surround sound audio receiver. The surround sound systems may be, for example, 5.1 (six channels), 7.1 (eight channels) or may contain more number of channels. There are many other proprietary and industry standards that define multi channel audio systems. The sound reproduction in these systems is much closer to reality, and allows use of special effects. For example, the "Dolby 5.1" based surround process involves placing left, center, right, left surround, right surround speakers and a subwoofer speaker, all placed appropriately in a hall. The result is a more balanced listening environment.

The sources for surround sound systems are multi channel recording in storage media, where for each of the surround sound channels a track is dedicated. The audio source for a surround sound receiver may be a Cable, Satellite or Fiber Set-Top-Box (STB), an antenna, a digital videodisk, a Personal Video Recorder (PVR), a computer network, TV broadcasts, game units and the Internet, among other sources.

2. Description of the Related Art

Today there are a number of audio/video devices that have audio transmission functionality and receive surround sound signals. Some of them reproduce audio signals in ways which are not consistent with the surround sound output. That is, the transmitters and the receivers come with different capabilities. However, the surround sound systems reserve a large bandwidth and have channels assigned for different microphone positions.

Audio signals from legacy music programs can be recorded in either single channel (mono) or two channels (stereo). When these mono or stereo signals are used in a surround sound system, a portion of the bandwidth reserved for the surround sound signals may be left unutilized.

Further limitations and disadvantages of conventional and traditional approaches will become apparent to one of ordinary skill in the art through comparison of such systems with the present invention.

DETAILED DESCRIPTION OF THE INVENTION

The present invention relates generally to surround sound communication systems and the following description involves the application of the present invention to a home audio-video system. Although the following description relates in particular to the application of the present invention to a home audio-video system, it should be clear that the teachings of the present invention can be applied to other types of audio-video systems and to audio systems alone.

In the context of the present invention, surround sound audio systems are a natural progression from two-channel stereo systems, which have been in use for several decades. The present invention is an effort in this direction, which facilitates adaptive usage of reserved channels in an audio system to send supplementary data in addition to the audio signals. The term primary source is used to define the original audio source of the transmitter while the term secondary source is used to define the source of the supplementary data throughout the document. The primary source may comprise audio signals from mono, stereo or surround sound music source, or voice signals such as that of a television channel while the supplementary data may comprise of advertisements, community information, public service information or even computer data.

Figure 1:
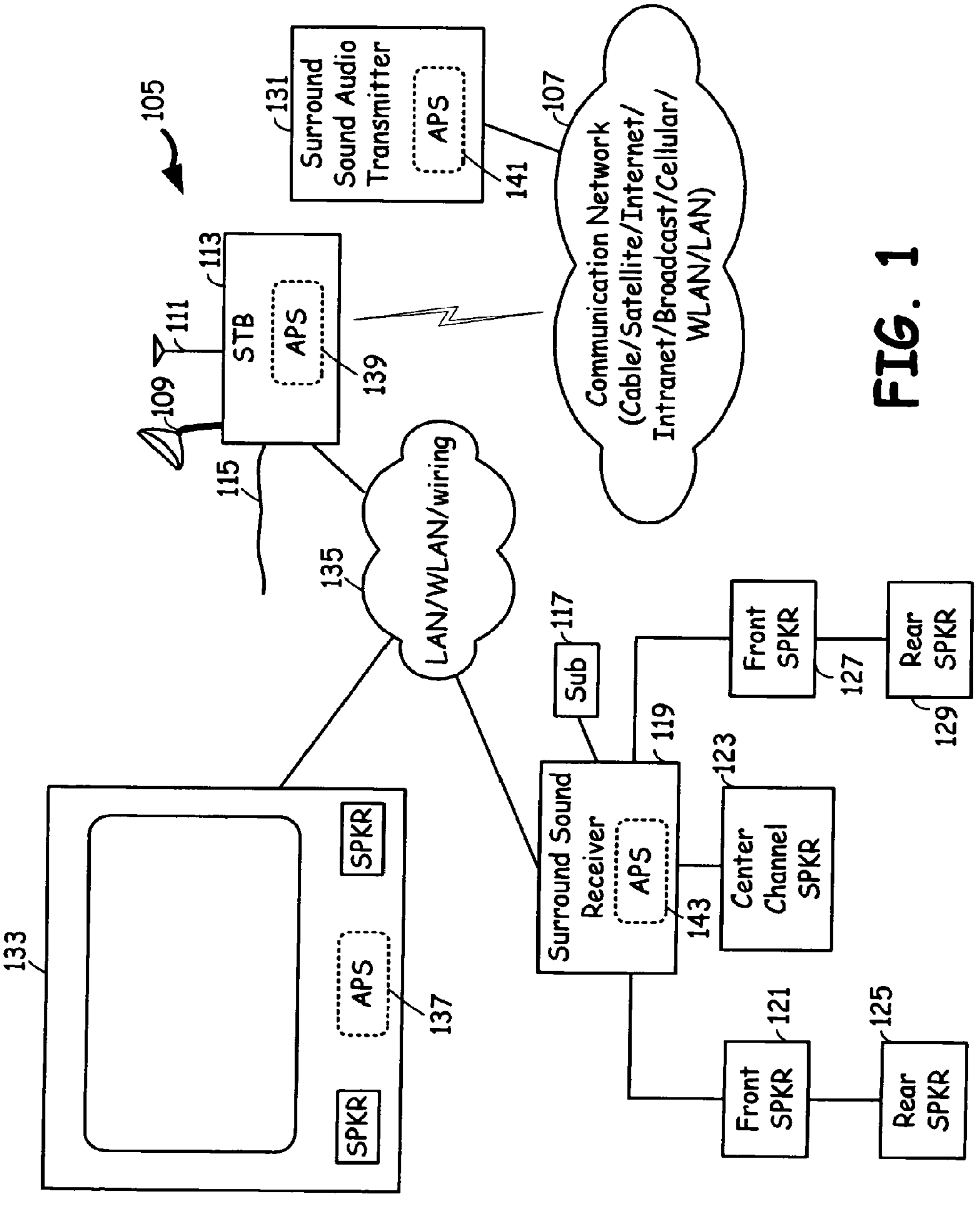
FIG. 1 is a block diagram illustrating an embodiment of an audio processing system (APS) according to the present invention that is incorporated into a surround sound communication system, both at the transmitter and at the receiver.

FIG. 1 is a block diagram 105 illustrating an embodiment of an audio processing system (APS) according to the present invention that is incorporated into a surround sound communication system, both at the transmitter and at the receiver. The APS includes one or more components 137, 139, 141 and 143 that are incorporated into one or more components of a typical audio communication system 105, both at the transmitter and at the receiver. The typical audio communication system 105 includes a set top box (STB) 113, a television 133, a surround sound system 119 and/or a surround sound audio transmitter 131. The audio communication system 105 components at the receiving end 113, 133 and 119 communicatively couple to one another via one of a wireless local area network (WLAN), a local area network (LAN), and/or wired or wireless point-to-point link 135. Additionally audio communication system 105 components at the receiving end may include (not shown in FIG. 1) radio systems, pocket television systems, computers or any other prospective systems with audio functionality that utilize mono, stereo or surround sound audio stream.

The surround sound audio transmitter 131 (or the transmitter end 131 of the communication system 105) is communicatively coupled to the audio communication system 105 components at the receiving end 133 and 119, through a set-top-box 113, via a communication network 107. The communication network 107 includes at least one of a cable network, a satellite network, an Internet, an Intranet, a broadcast, a cellular network, a wireless local area network and/or a wired local area network. The set-top-box 113 receives audio/video signals from the external program source 153 via one of a dish antenna 109, a roof top antenna 11 and/or a wire antenna 149.

Although each of the components at the receiving end 113, 133 and 119 contains full APS audio processing functionality, via circuitry and processing operations, full APS functionality might also be distributed in portions across two or more of the components 137, 139 and 143. Further, the APS at the receiving end 113, 133 and 119 may also include a separate piece of equipment (not shown) that provides dedicated APS functionality or separate computer (not shown) running software tailored to perform APS processing. The APS components at the transmitter side 141 and the APS components at the receiving end 137, 139 and 143 of the communication system 105 differ functionally, but are compatible with each other and function as a coherent APS unit.

The APS 141 at the surround sound audio transmitter 131 elicits information regarding the number of channels needed for the receiver 113, 119 and 133 and allocates certain number of channels accordingly for the primary source and utilizes unused channels for sending supplementary data from the secondary source. For example, the receiver may be utilizing only two of the 7.1 surround sound channels for the primary source during certain transmission period. This situation may occur when the user wishes to listen to certain program in stereo such as during a television program or a musical program and may decide to utilize rest of the channels for downloading supplementary data. In this case, the APS 137, 139 and 143 at the receiver 113, 119 and 133 automatically sends appropriate control signals and messages to the APS 141 at the transmitter 131. The transmitter APS 141 upon detecting the control signals and the messages allocates the unused six channels for transmitting supplementary data from the secondary source. The transmitter can change the control signal at run time to indicate the change in the types of the supplementary data. Also the transmitter can send a control signal at run time to indicate that it want to use the one or more of the surround channels rather than utilizing them for supplementary data. The receiver APS allocates the audio channels accordingly.

Alternatively, the APS 141 at the surround sound audio transmitter 131 allocates certain number of channels to supplementary data from the secondary source if audio signals from the primary source contain less than maximum reserved channels for transmission. This situation may occur when the audio from the primary source is either mono, stereo or a surround sound signal that utilizes less than the reserved number of channels, such as during a voice signal transmission or a legacy musical signal transmission. In this case, the APS 141 at the surround sound audio transmitter 131 automatically detects that the primary source is not utilizing all of the reserved channels and pushes supplementary data from the secondary source in the unused channels.

As a third alternative, the APS 141 at the surround sound audio transmitter 131 may decide to constrict some of the channels of surround sound audio signals from the primary and utilize the unused channels for sending the supplementary data from the secondary source. For instance, when there is a necessity to send certain supplementary data from the secondary source, the transmitter may convert a 7.1 surround sound signals from the primary source to a 5.1 surround sound signal by combining signals of two of the channels with that of rest of the channels and allocate the unused two channels for sending supplementary data from the secondary source.

Here, the supplementary data from the secondary source may contain advertisements, community information and public service information, or may even contain computer data. For example, during a weather emergency, the senders at the transmitter side 131 may decide to send public warning regarding the weather in two of the 7.1 surround sound system channels to the audience. Depending upon the settings at the receiver end 113, 133 or 119, the audience may be able to hear the warning simultaneously with the music from the primary source in two of the channels. As another example, the user may decide to utilize two of the 7.1 surround sound music system channels to download music/movie program from a local broadcaster by using the STB 113. The user may program the APS 139 of the STB 113, using appropriate interfaces (not shown), to download a desired music/movie program and download and store the program in the memory of the STB 113. One more instance of utilizing supplementary data in a communication system 105, is that of utilizing free channels for other purposes such as sending audio information in alternate languages. There are many other instances where either the APS 137, 139 or 143 at the receiver end 133, 113 or 119, or the APS 141 at the transmitter end 131 of the communication system, in a coherent fashion, decide upon freeing up some of the channels of the primary source and utilize the free channels for communicating supplementary data from the secondary source based upon the different capabilities of the transmitter component 131 and the receiver component 133, 113 or 119.

In another scenario, the user at the receiver APS 137, 139 or 143 may want to input transmitted multi-channel audio to be down mixed to lesser number channels. Then the user may want to hear some other audio at the speakers corresponding to one or more of the remaining audio channels as per the user's wish. This audio can be stored locally at the receiver end. The reproduction of this local audio at the remaining channels may be done by the receiver APS itself.

In terms of transmission of audio over a carrier such as a broadcast over the air, the multiple channels of a surround sound system are just logical, in reality they are digitally multiplexed before transmission or some other variation of such transmission methods are used. The APS 139, 137 or 143 at the receiving end 113, 133 and 119 of the communication system demultiplex the incoming digital stream, and based upon a header information that accompany the supplementary data decide upon the channels used for the primary source and the secondary source and segregate the signal accordingly. Then, the audio signals of the primary source are routed for presentation locally through speakers and the supplementary data are routed through appropriate predetermined channels for presentation through local speakers, display systems or routed for storage through an external port.

The surround sound receiver 119 provides audio-visual experiences that are comparable to that of a cinema theater. The surround sound receiver 119 typically consists of multiple speakers such as a sub woofer 117 usually placed in the front of the hall, a center channel speaker 123 placed in the front-center of the hall, two front speakers 121, 127 placed in the front-left and front-right of the hall and two rear speakers 125, 129 placed in the rear-left and rear-right of the hall. The surround sound receiver 119 may provide the audio for the television 133. According to one operation of the present invention, the audio signal from the primary source is presented via some of the speakers of the surround sound system 119 while the supplementary data from the secondary source is presented through the rest of the speakers or displayed in the television 133 screen or provided to the user through an external port (not shown) in the surround sound receiver 119.

For example, the surround sound receiver 119 may present the audio signals from the secondary source (public service information, for instance) via the center channel speaker 123 and the music signal of the primary source via the front and rear speakers 121, 125, 127, and 129. According to an aspect of the present invention, a user may independently control volume levels or any other characteristics of the supplementary data from the secondary source via: 1) buttons of a remote control (not shown); 2) control operations of the surround sound system 119; 3) buttons on the television set 133; and 4) other control mechanisms.

Alternatively the supplementary data transmitted through one or more of the audio channels may not be reproduced through the speakers connected to the receiver. This data may be utilized for some other purpose such as but not limited to controlling the receiver, providing some synchronization information to synchronize the transmitter and the receiver, some configuration information of the transmitter and/or receiver and/or the communication network between the transmitter and the receiver, etc.

Figure 2:
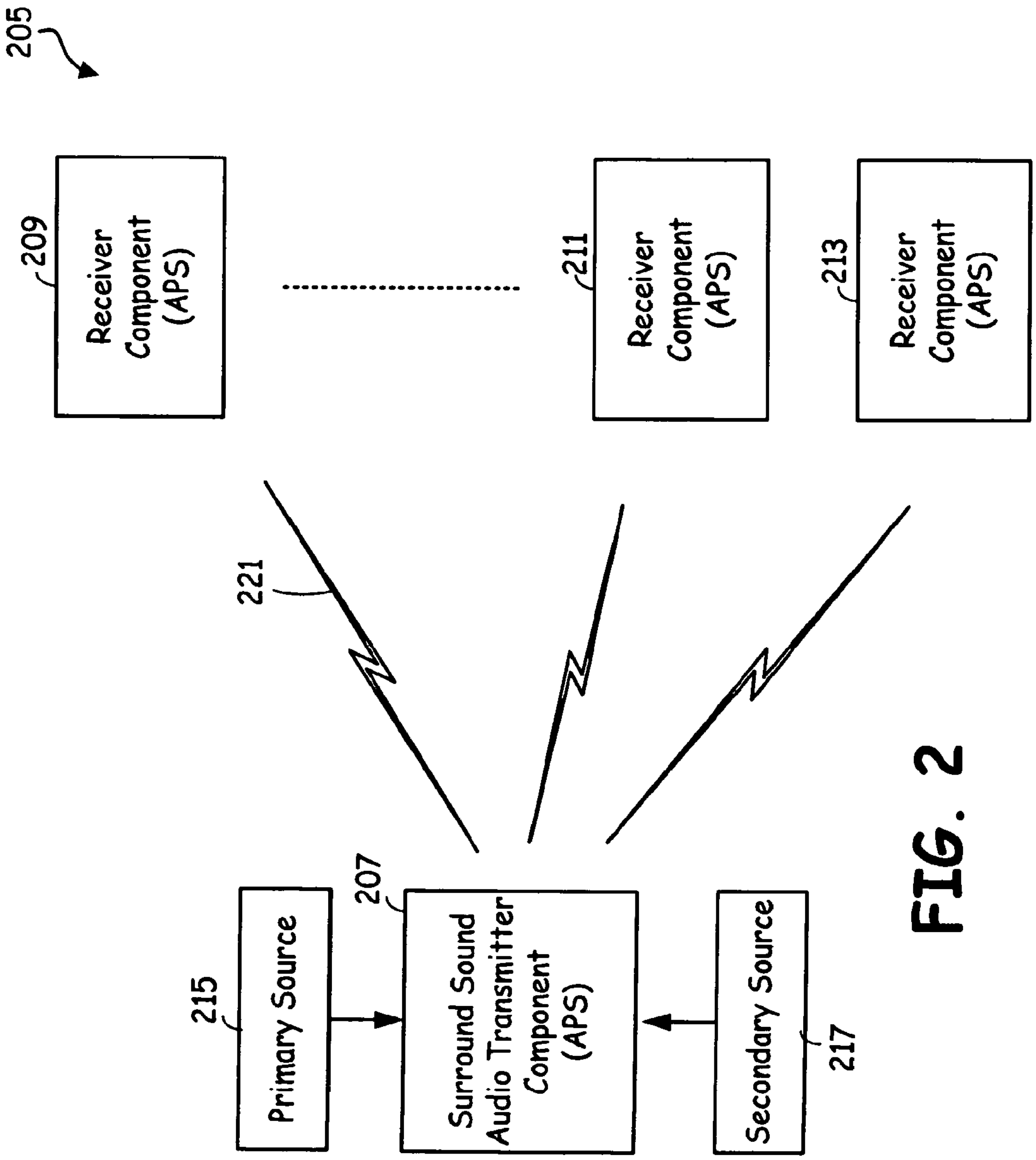
FIG. 2 is a block diagram illustrating audio processing system as a transmitter and receiver components of surround sound communication system.

FIG. 2 is a block diagram 205 illustrating audio processing system as a transmitter and receiver components of surround sound communication system in accordance with the present invention. It comprises a primary source 215, a secondary source 217, a surround sound audio transmitter component 207 containing an audio processing system (APS) component and a plurality of receiver components 209, 211 and 213 as other audio processing system components. The surround sound audio transmitter component 207 and the plurality of receiver components 209, 211 and 213 are communicatively coupled via a communication channel or communication pathway 221. In this embodiment of the invention, the transmitter 207 and the receivers 209, 211, 213 are communicatively coupled via a common communication channel 221 such as an open air.

The surround sound audio transmitter component 207 is typically a digital multi-channel surround sound music system with a modulator and a radio frequency (RF) amplifier. The surround sound audio transmitter component 207 receives audio inputs from the primary source and supplementary data from the secondary source 217 and adaptively transmits either or both of these input signals via a common communication channel 221. In one embodiment of the present invention, surround sound audio transmitter component 207 uses a 7.1 surround sound audio digital format signals as a multiplexed data stream during the periods in which no supplementary data are transmitted, that is, in effect eight logical channels are available for transmission. The surround sound audio transmitter component 207 may utilize all of the six channels as a multiplexed digital stream for the primary source 215. When a decision is taken by the APS to free some of the channels of the primary source 215 and allocate those freed channels for the supplementary data of the secondary source 217 adaptively in real time, the surround sound audio transmitter component 207 multiplexes the supplementary data of the secondary source 217 along with audio signals of the primary source and broadcast them as a single data stream.

The surround sound audio transmitter component 207 transmits at the beginning of the change in the status of the channel allocation as well as periodically a control signal or a header in the channels used for the supplementary data. The receiver components 209, 211, 213 detect and decode the control signals and appropriately present the audio signals from the primary source 215 and the supplementary data from the secondary source 217 to the users.

In one embodiment, the communication channel 221 may be open air as is the case with broadcasting communication systems, or may be wireless channel, or wired channel. The communication channel 215 carries multi channel surround sound digital signal alone on a RF carrier, or combined with supplementary data. In another embodiment, the RF carrier in the communication channel 215 may carry analog frequency modulated (FM) by frequency division multiplexing (FDM) of audio signals from the primary source 215 and the supplementary data from the secondary source 217.

The receiver components 209, 211 and 213 typically are surround sound digital receivers such as the ones in home theatre systems. Typically, these receiver components 209, 211 and 213 are capable of receiving multiplexed digital signal and decode them and deliver surround sound audio output to the speakers. With the APS incorporated in the receiver components 209, 211 and 213, they are able to discriminate between primary source and the secondary source, adapt to a changed allocation of channels during any period of the transmission and deliver appropriate outputs accordingly.

For example, the multi-channel surround sound audio transmitter component 207 may be a television broadcasting unit or Frequency Modulation (FM) broadcasting unit communicating with a plurality of surround sound audio receiver components 209, 211 and 113. In this case, the receiver components 209, 211 and 213 are many of the television receivers or FM receivers with built in multi-channel surround sound capabilities and the APS incorporated.

Aspect of the present invention are found in a surround sound system 205 that makes efficient use of audio channels by utilizing unused channels to send supplementary data from the second source 217. The surround sound system 205, in accordance with the present invention, adaptively communicates supplementary data from the second source 217 in addition to plurality of surround sound channels from the primary source 215. In one related embodiment, the surround sound system 205 consists of a transmitter component 207 that transmits signals from the primary source 215 and data from a secondary source 217. In addition, the receiver components 211, 213, 209 that may be communicatively coupled to the transmitter component 207 receives a plurality of channels audio signals and supplementary data. A communication pathway 221 facilitates transmission and reception of digital audio signals multiplexed with data.

The primary source 215 may comprise of audio signals from mono, stereo or surround sound music source, or voice signals such as that of a television channel while the supplementary data may comprise of advertisements, community information, public service information or even computer data. The communication pathway 221 may consist of a cable network, a satellite network, an Internet, an Intranet, a broadcast, a cellular network, a wireless local area network and/or a wired local area network. The transmitter component 207 may be a broadcast unit or a point-to-point communication transmitter. The receiver components 209, 211, 213 may be a surround sound system, a television or any other receiver with or without surround sound audio capability.

The transmitter component 207 of the surround sound system 205 adaptively transmits primary source data as well as supplementary data. This is done by way of the transmitter component 207 communicating supplementary data in some of the plurality of reserved surround sound communication channels based upon the information of number of channels supported by the surround sound audio transmitter component 207 and the receiver components 209, 211, 213, in real time. The information of the number of channels supported by the surround sound audio transmitter component 207 and the receiver components 209, 211, 213 is obtained by the receiver component communicating the number of channels needed for primary source, in real time. The transmitter component adaptively communicates the supplementary data to one or more receiving components 209, 211, 213. The transmitter component 207 adaptively allocates the available number of channels between the primary source and the secondary source on a need to basis, for example by freeing up the communication channels reserved for surround sound system. In a related embodiment, the surround sound transmitter component 207 communicates a header in real time to allow the receiver components 209, 211, 213 to identify changes in the channel allocation between the primary source 215 and the supplementary data of the secondary source 217.

In one embodiment, the surround sound audio transmitter component 207 is capable of adaptively multiplexing signals from the primary source 215 and the secondary source 217 to produce a single digital multiplexed transmission signal and transmit using the reserved communication means 221. The surround sound audio transmitter component 207 comprises of a producer/mixer multi channel audio unit that generates audio signals in plurality of audio channels from the signals from the primary source 215, a digital encoder that encodes the plurality of audio channels from the primary source 215 in a digital stream, a digital supplementary data encoder that encodes supplementary data from the secondary source 217 into the digital stream, and a channel-allocating unit that allocates digital channels between the primary source 215 and the secondary source 217. The channel allocating unit adaptively allocates the reserved communication channels between the primary source 215 and the secondary source 217 on a as needed basis, by freeing up some of the communication channels reserved for surround sound system during the supplementary data transmission. The channel allocating unit inserts a header at the beginning of sending supplementary data of the secondary source 217 as well as at regular intervals which allow the receiver components to distinguish between the audio signals of the primary source 215 and the supplementary data of the secondary source 217.

In one embodiment, the surround sound system 207 uses a control signal in order to discriminate between surround sound audio signal of the primary source 215 and supplementary data of the secondary source 217. The method of operating it comprises (i) determining, based on the primary source bandwidth, the number of unused channels, and transmitting a protocol based header initially before transmission of actual data as well as at regular intervals, in extremely short bursts, in unused channels; (ii) transmitting multi-channel audio data as well as supplementary data within the reserved bandwidth during the period in which not all channels are used for primary source; (iii) receiving and reproducing primary source data as suggested by the headers, until next header informs about the changes in channel allocations; and (iv) decoding and outputting to a port supplementary data from the spare channels which do not contain the audio program of primary source as per protocol based header and using it for other purposes.

Figure 3:
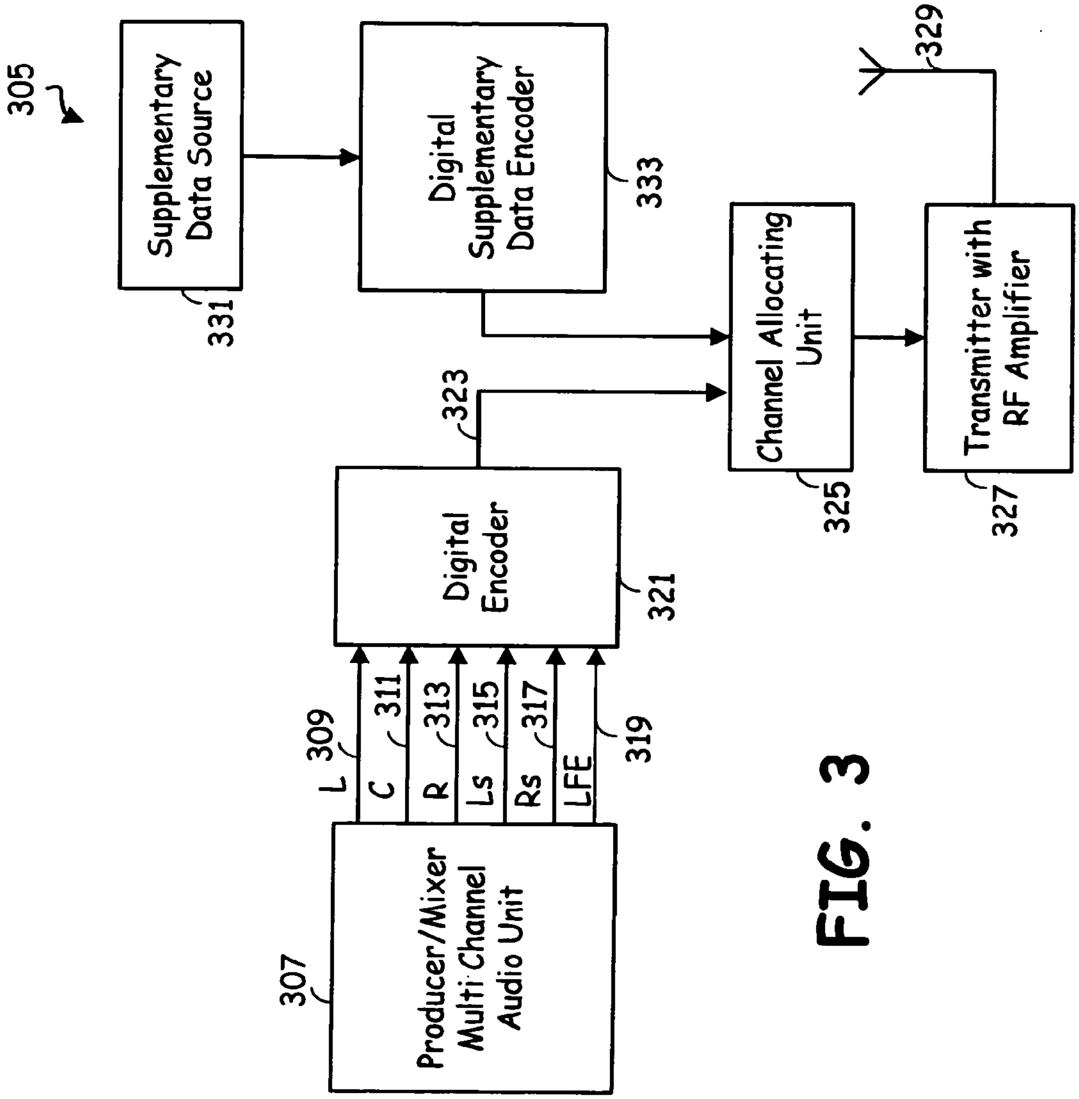
FIG. 3 is a perspective block diagram that shows functional blocks involved in an exemplary 5.1 surround sound transmitter component of the audio processing system.

FIG. 3 is a perspective block diagram 305 that shows functional blocks involved in an exemplary 5.1 surround sound transmitter component of the audio processing system, in accordance with the present invention. The surround sound transmitter component 305 comprises of a producer/mixer multi-channel audio unit 307, a digital encoder 321, a supplementary data source 331, a digital supplementary data encoder 333, a channel allocating unit 325, a transmitter with radio frequency (RF) amplifier 327 and an antenna 329.

The produce/mixer multi-channel audio unit 307 is the source of six-channel analog audio signal. It outputs left channel signal (L) 309 meant for the front-left speaker, center channel signal (C) 311 meant for the a center channel speaker, right channel signal (R) 313 meant for the front-right speaker, left surround channel signal (Ls) 315 meant for the rear-left speaker, right surround channel signal (Rs) 317 meant for the rear-right speaker and low frequency effects channel signal (LFE) 319 meant for the sub woofer (refer to the FIG. 1 for the speaker arrangements in a 5.1 surround sound receiver). These six channels are referred to as a 5.1 channel surround sound system because there are five full bandwidth channels with 3 Hz to 20 KHz frequency range for each of front left (L) 309, right (R) 313, center (C) 311 and surround (Ls and Rs) 315, 317, and one more low frequency effects (LFE) subwoofer channel 319 devoted to low frequencies from 3 Hz to 120 Hz. The producer/mixer multi channel audio unit 307 may further output mono, stereo (two channel) or 5.1 channel surround sound signals depending upon the audio source.

The digital encoder 321 is responsible for digitally representing the six-channel analog input and multiplexes them to produce a primary digital bit stream 323 and sends them to channel allocating unit 325. In its full capacity, the primary digital bit stream 323 represents a 5.1 surround sound audio output. A supplementary data source 331 produces supplementary data from the secondary source. This supplementary data is digitized using digital supplementary data encoder 333 and the secondary digital data bit stream as an output from the digital supplementary data encoder 333 is sent to channel allocating unit 325.

The channel allocating unit 325 is responsible for determining equivalently the number of channels to be allocated to the primary digital bit stream 323 and the number of channels to be allocated to the secondary digital data bit stream, in the total of 6 channels reserved for the transmission of 5.1 surrounds sound signals. The channel allocation may be done based upon one of the many ways discussed with reference to FIG. 1. The channel allocating unit 425 may measure the bandwidth or bit rate of the primary digital bit stream 323 and there by determine the number of channels that need to be allocated to the primary source. Based on this measured information, the channel allocating unit 325 decides the periods during which the secondary digital data bit stream (from the digital supplementary data encoder 333) may be multiplexed and sent with the primary digital bit stream 323. Alternatively, the channel allocation may occur based upon the control signals and messages received from the receiver.

Further, the channel allocating unit 325 inserts a control signal or a header in the unused channels prior to the transmission of secondary digital data bit stream and also intermittently. Finally, the transmitter with RF amplifier 327 digitally modulates the multiplexed digital bit stream from channel allocating unit 325, amplifies the resulting RF signal and broadcasts this signal via an antenna 329.

In an embodiment, the digitally coded information in the protocol based header include information such as the number of channels required for multi-channels surround sound audio program (primary source), the number of unused channels containing data, the contents of the data in the unused channels, the radio frequency bandwidth or bit rate (as is appropriate) used for primary source and bandwidth or bit rate used for supplementary data, the channel designation for primary data and whether the supplementary data is an audio signal or digital data. The channel designation also includes one of default allocation in which entire bandwidth is allocated to the primary source when the input to the surround sound system is one of multi-channel surround sound audio.

The header information in the surround sound system further facilitates preprogrammed management actions of the receiver component as well as managing preprogrammed advertisements.

Figure 4:
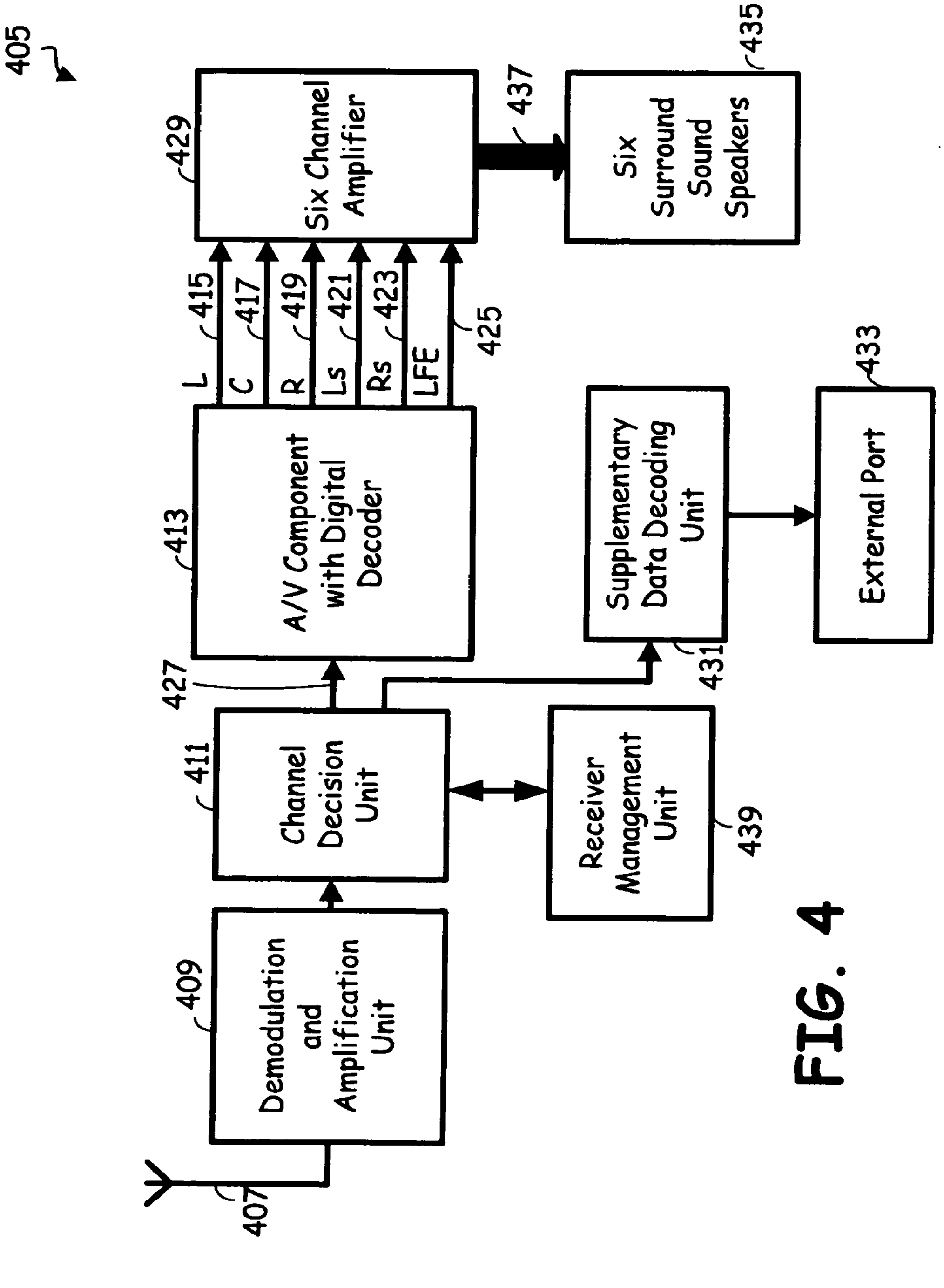
FIG. 4 is a perspective block diagram that shows functional blocks involved in an exemplary 5.1 surround sound receiver component of the audio processing system.

FIG. 4 is a perspective block diagram 405 that shows functional blocks involved in an exemplary 5.1 surround sound receiver component of the audio processing system, in accordance with the present invention. The 5.1 surround sound receiver component shown in FIG. 4 corresponds to the 5.1 surround sound transmitter component of FIG. 3. In actuality, the transmitter and receiver components shown in FIG. 3 and FIG. 4 may be any surround sound communication system, according to the present invention. The 5.1 surround sound receiver component 405 comprises of a demodulation and amplification unit 409, a channel decision unit 411, a audio/video component with digital decoder 413, a six channel amplifier 429, a six surround sound speakers 435, a supplementary data decoding unit 431, an external data port 433, a receiver management unit 439 and an antenna 407. The 5.1 surround sound receiver component speakers 435 comprises of six speakers, namely (shown in FIG. 1) a sub woofer 117 usually placed in the front of the hall, a center channel speaker 123 placed in the front-center of the hall, two front speakers 121, 127 placed in the front-left and front-right of the hall and two rear speakers 125, 129 placed in the rear-left and rear-right of the hall. The speakers are connected to the six channel amplifier via a communication link 437, wired or wireless.

The surround sound radio frequency (RF) signals are picked up communication channel such as an open air channel, via an antenna 407. This signal is received by the demodulation and amplification unit 409. The demodulation and amplification unit 409 accepts the RF signal, down converts it, demodulates and amplifies to produce the transmitted multiplexed digital stream. The multiplexed digital stream is sent to the channel decision unit 411.

The channel decision unit 411 receives appropriate control signals from the receiver management unit 439 and is responsible for distinguishing between the surround sound signals of the primary source and the supplementary data of the secondary source. The receiver management unit 439 sends control signals to the channel decision unit 411 based upon the user input. The channel decision unit 411 by default assumes that all of the six channels are occupied by the surround sound signal of the primary source, in the absence of any header (control signal) and sends the output to the A/V component with digital decoder 413. When the channel decision unit 411 detects a header, based on this control signal, it decides upon the number of channels and their allocation between the surround sound signals of the primary source and the supplementary data of the secondary source. Then, the channel decision unit 411 segregates the surround sound signals of the primary source and the supplementary data of the secondary source and demultiplexes them and sends the primary source signals to the A/V component with digital decoder 413 and the supplementary data to the supplementary data decoding unit 431. Further, the channel decision unit 411 extracts signals meant for preprogrammed management actions of the receiver component as well as managing preprogrammed advertisements and send these control signals to the receiver management unit 439.

The A/V component with digital decoder 413 extracts one or more channels of audio data of the primary source and decodes it, coverts the digital signal to analog and communicates these surround sound signals to the six channel amplifier 429. The output of A/V component with digital decoder 413 comprises of left a channel signal (L) 415, a center channel signal (C) 417, a right channel signal (R) 419, a left surround channel signal (Ls) 421, a right surround channel signal (Rs) 423 and a low frequency effects channel signal (LFE) 425. The six channel amplifier 429 is a unit of pre amplifier as well as a power amplifier, having six discreet amplifier units, and is responsible for amplifying signals and sending them to the six surround sound speakers 335 appropriately, via a communication link 437.

In accordance with an embodiment of the present invention, the receiver management unit 439 is responsible for controlling the receiver unit based on remote management control actions sent by the transmitter component 305 (shown in FIG. 3). Further, the receiver management unit 439 activates advertisement actions preprogrammed in the receiver.

Figure 5:
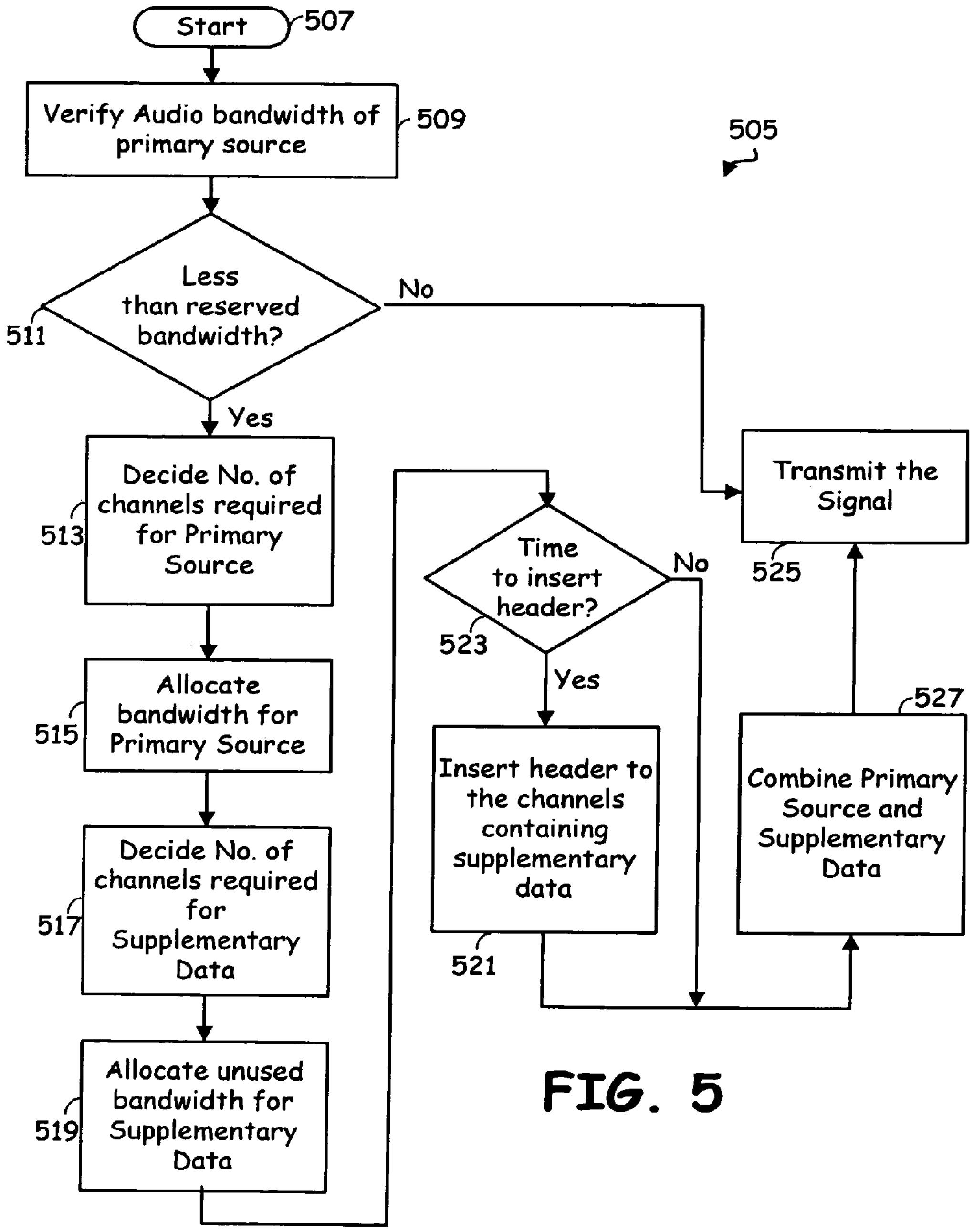
FIG. 5 is a flow chart depicting the method of allocating unused channels for sending supplementary data in addition to the primary audio data of surrounds sound signals, using a control signal.

FIG. 5 is a flow chart 505 depicting the method of allocating unused channels for sending supplementary data in addition to the primary audio data of surrounds sound signals, using a control signal. The method of sending supplementary data from a secondary source in the multi-channel surround sound channels reserved for the primary source, starts at a start block 507 when the transmitter begins to transmit a particular primary source based program and the entire process shown in the flow chart 505 repeats at regular intervals. Then, at the next block 509, the transmitter verifies the audio bandwidth of the primary source. Alternatively, at block 509, the transmitter may measure the bit rate of the digital signal as well. For example, if the primary source signal input is mono, the transmitter measures the audio bandwidth as 20 kHz, on the other hand, if the input signal is a multi-channel surround sound signal, the transmitter measures the bandwidth as multiples of 20 kHz. Alternatively, at block 509, the transmitter may force the digital bit stream of the primary source to occupy lesser bandwidth, when there is a necessity to push supplementary data from the secondary source.

Then, at a next decision block 511, the transmitter determines if the measured bandwidth requires the entire reserved surround sound bandwidth for transmission. The transmitter determines at the decision block 511, whether the measured bandwidth is less than the reserved bandwidth and if not, transmits the multi-channel surround sound signal at a block 525. For example, in a six-channel surround sound system, if the primary source bandwidth is 120 kHz, then the transmitter determines that there is no free space for the supplementary data at the time of measurement and decides to transmit the six-channel surround sound signal without any supplementary data until next measurement is made after some time.

If, at a decision block 511, the transmitter determines that the primary source bandwidth is less than the reserved bandwidth, then the transmitter decides on the number of channels required for primary source at a next block 513. The transmitter decides on the number of channels required for the primary source at the block 513 based upon the bandwidth of primary source and depending upon the multiples of single channel audio bandwidth. Then, at a block 515, the transmitter allocates the determined number of channels for the primary source. The transmitter, at a next block 517, determines the number of channels that can be used for the supplementary data of the secondary source. This is done by subtracting the number of channels used by the primary source from the reserved number of channels. Then, at a block 519, the transmitter allocates the unused channels, as determined at the block 517, for transmission of supplementary data from the secondary source.

Then, at a next decision block 523, the transmitter decides if it is the time for inserting the header. The transmitter inserts header prior to the transmission of supplementary data of the secondary source as well as at regular intervals, in the channels allocated for the supplementary data. If, at the decision block 523, the transmitter decides that it is time to insert header, the transmitter inserts appropriate header in the channels used by the supplementary data at a next block 521 and proceeds to a block 527. If, on the other hand, at the decision block 523, the transmitter decides that it is not time to insert header, it combines primary source data and supplementary data at a next block 527, in channels as allocated at the blocks 515 and 519. Finally, this combined signal, which may be digitally multiplexed as is the case in digital modulation or may simply be put together in adjacent channels as is the case in analog frequency modulation, is transmitted in the reserved channels at the block 525.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. An audio processing system, comprising:

a processor; and a transmitter that is operatively coupled to the processor, the processor configured to:

determine a first number of channels available for audio signals from a primary source in the transmitter;

determine a second number of audio channels available in a remote receiver that is capable of receiving the audio signals from the primary source;

compare the first number of channels with the second number of audio channels;

determine that the first number of channels does not equal the second number of audio channels;

cause a secondary source to adaptively communicate supplementary data in place of at least one of a plurality of channels reserved for the audio signals from the primary source based at least in part upon the determination that the first number of channels does not equal the second number of audio channels.

2. The audio processing system according to claim 1, wherein the processor employs information received from the remote receiver, wherein the information includes a number of channels needed for the primary source, wherein the information is used to determine and assign the first number of channels available for the audio signals from the primary source in the transmitter.

3. The audio processing system according to claim 1, wherein the processor allocates the plurality of channels between one or more of the audio signals from the primary source and the supplementary data from the secondary source in order to coordinate a delivery of the supplementary data as well as the one or more of the audio signals from the primary source.

4. The audio processing system according to claim 3, wherein the primary source comprises a surround sound source, and wherein the transmitter communicates a header to identify changes in a channel allocation between the primary source and the secondary source.

5. The audio processing system according to claim 1, wherein the processor assigns at least one of the plurality of channels to the secondary source for a duration of a delivery of the supplementary data and reassigns the at least one of the plurality of channels to the audio signals from the primary source after the delivery of the supplementary data.

6. The audio processing system according to claim 1, wherein the processor generates a combined audio signal from a plurality of audio channels provided by the primary source.

7. The audio processing system according to claim 6, wherein the processor encodes the combined audio signal into a digital stream.

8. The audio processing system according to claim 7, wherein the processor encodes at least some of the supplementary data from the secondary source into the digital stream, wherein the transmitter transmits the digital stream as a digital multiplexed transmission signal.

9. The audio processing system according to claim 1, wherein the channels available for audio signals from a primary source in the transmitter comprise audio channels.

10. An audio processing system, comprising:

a processor; and a transmitter that is operatively coupled to the processor, the processor configured to:

deliver a plurality of channels of audio signals received from a primary source through the transmitter to a receiver;

determine a number of audio channels available in the receiver;

compare the number of audio channels available in the receiver with a number of the plurality of channels;

determine that the number of audio channels available in the receiver does not equal the number of the plurality of channels;

selectively replace at least one of the plurality of channels with data from a secondary source for delivery through the transmitter;

assign at least one of the plurality of channels to the secondary source for a duration of a delivery of the data from the secondary source; and reassign the at least one of the plurality of channels to at least one of the audio signals received from the primary source after the delivery of the data from the secondary source.

11. The audio processing system according to claim 10, wherein the primary source includes a surround sound audio signal generator, and the audio signals received from the primary source correspond to audio signals from a plurality of surround sound audio channels.

12. The audio processing system according to claim 10, wherein the data from the secondary source comprises a plurality of different types of supplementary data.

13. The audio processing system according to claim 12, wherein the plurality of different types of supplementary data comprise at least one of advertisements or title information associated with the audio signals received from the primary source.

14. The audio processing system according to claim 10, wherein the data from the secondary source comprises computer data.

15. An audio processing system, comprising:

a primary source;

a secondary source;

a channel allocator that allocates digital channels between the primary source and the secondary source based on a determination that a number of audio channels available for audio signals from the primary source in a transmitter of the audio processing system does not equal a number of audio channels available in a remote receiver that is capable of receiving the audio signals from the primary source, wherein the audio processing system is configured to multiplex the audio signals from the primary source and signals from the secondary source to produce a digital multiplexed transmission signal;

a mixer that generates a combined audio signal from the audio channels provided by the primary source;

a digital encoder that encodes the combined audio signal into a digital stream; and a digital supplementary data encoder that generates the digital multiplexed transmission signal by encoding supplementary data from the secondary source into the digital stream.

16. The audio processing system according to claim 15, wherein the channel allocator allocates the digital channels such that the digital channels are distributed between the primary source and the secondary source, and wherein the channel allocator is configured to free up one or more of the digital channels allocated to the primary source for a supplementary data transmission from the secondary source.

17. The audio processing system according to claim 16, wherein the channel allocator is configured to insert a header in the supplementary data transmission from the secondary source for identification purposes.

18. The audio processing system according to claim 17, wherein the channel allocator is configured to insert a header in the digital channels that are allocated for the supplementary data, and wherein the channel allocator is configured to employ a control signal at a beginning of a channel reallocation of the digital channels or a control signal at regular intervals to indicate a current channel allocation status.

19. The audio processing system according to claim 15, comprising:

a demodulator and amplifier configured to demodulate and amplify received radio frequency signals to produce the digital multiplexed transmission signal, wherein the digital multiplexed transmission signal includes data from a remote primary source and data from a remote secondary source;

a channel processor configured to decode header information in the digital multiplexed transmission signal and demultiplexes the data from the remote primary source and the data from the remote secondary source;

a digital decoder configured to decode the demultiplexed data from the remote primary source; and a supplementary data decoder configured to decode the demultiplexed data from the remote secondary source.

20. The audio processing system according to claim 19, wherein the channel processor configured to decode the header information in the digital multiplexed transmission signal is further configured to decode the header information and determine a distribution of channels between the data from the remote primary source and the data from the remote secondary source at regular intervals.

* * * * *